United States Patent [19]
Blossey et al.

[11] Patent Number: 5,706,085
[45] Date of Patent: Jan. 6, 1998

[54] METHOD FOR THE NON-CONTACT RAPID AND ACCURATE ACQUISITION OF THE SURFACE TOPOLOGY OF OBJECTS

[76] Inventors: Stefan G. Blossey, Leipziger Str. 20, D-91058 Erlangen; Gerd Häusler, Alterlanger Str. 33, D 91056 Erlangen, both of Germany

[21] Appl. No.: 513,024

[22] Filed: Aug. 9, 1995

[51] Int. Cl.[6] ................................................. G01B 9/02
[52] U.S. Cl. ...................................... 356/357; 356/360
[58] Field of Search ................................. 356/357, 358, 356/359, 360

[56] References Cited

U.S. PATENT DOCUMENTS

| | | | |
|---|---|---|---|
| 5,122,648 | 6/1992 | Cohen et al. | 356/357 |
| 5,204,734 | 4/1993 | Cohen et al. | 356/359 |

*Primary Examiner*—Samuel A. Turner
*Attorney, Agent, or Firm*—Herbert L. Lerner; Laurence A. Greenberg

[57] ABSTRACT

The method allows contact-less, precise and rapid measurement of the macroscopic shape of objects. The method is based on the Michelson-interferometer with the object mirror being replaced by the object to be measured. A low coherent light source is used. As either the reference mirror or the object is moved, an intensity modulation can be observed on the observation screen. The height information can be derived from determining the maximum depth of modulation in association with the movement. The determination of the depth of modulation has required full sampling of the modulation at a high sampling rate, or quasistatic movements. Therefore common methods are rather slow. The envelope of the modulation is directly extracted by modulating the light source synchronously to the modulation of the interference patterns and by using a solid-state imaging array which shows low pass characteristics in terms of time. The method allows to move the object or the reference mirror significantly faster than in conventional short coherent interferometers at a far lower sampling rate. If a light source cannot be modulated, the flux of light hitting the target or the sensitivity of the photodetector can be modulated instead.

17 Claims, 4 Drawing Sheets

METHOD FOR THE NON-CONTACT RAPID AND ACCURATE ACQUISITION OF THE SURFACE TOPOLOGY OF OBJECTS

BACKGROUND OF THE INVENTION

Field of the Invention

The invention describes a method to measure the macroscopic topology of preferably rough surfaces (3D-sensor) at any trade-off between fast and precise.

The surface profile is described in an orthogonal cartesian coordinate system; x and y are the lateral and z is the longitudinal direction. The latter determines the direction of illumination, which is the direction of observation with regard to the invention, too. Sensors which measure the surface profile as a function z(x,y) are called 3D-sensors.

There are basically four different optical methods to measure objects without contact: laser triangulation including various embodiments, focus sensing methods, time-of-flight methods and last not least interferometric methods.

The triangulation method is based on different directions of illumination and observation (triangulation angle). The height information is translated into a lateral information on the observation side. An unavoidable problem with triangulation methods is shading due to the non-coaxial illumination and observation; the restricted depth of focus is another problem in embodiments which use encoded, two dimensional illumination. Additionally the depth uncertainty is determined by the observation aperture and, in case of rough objects, by speckle noise, as described in "Statistical properties of Laser speckle patterns" in "Laser Speckle and Related Phenomena", by J. W. Goodman, edited by J. C. Danty (Springer Verlag, Berlin 1984), which comes from illuminating a rough object by means of a short coherent light source. This is described in "About fundamental limits of three-dimensional sensing or nature makes no presents", by G. Häusler, Proc. of the 15the Congress of the international Commission of Optics, Garmisch-Partenkirchen, SPIE 1319, 352 (1990) and as described in "Physical Limits of 3D-Sensing", by G. Häusler, and J. Herrmann, Proc. SPIE 1822: Optics, Illumination an Image Sensing for Machine Vision VII, Boston, Mass. (1992).

The same holds for the focus sensing systems which determine the distance to a point of the object by moving it into the focus of observation, as described in "3D-sensing with a confocal optical 'macroscope'", by G. Häusler, and J. Herrman, Proc. of the 15the Congress of the international Comission of Optics, Garmisch-Partenkirchen, SPIE 1319, 352 (Aug. 1990).

The time-of-flight systems are not suitable for measuring objects at an accuracy of only a few micrometers. In order to resolve one micrometer, a resolution in time of the order of $10^{-14}$ s would be required.

Conventional interferometry can only be used for optically smooth objects, i.e. at a surface roughness which has to be far below the wavelength of the illuminating light source. This guarantees that the phase front is not destroyed as the light is reflected from the object and conventional phase-shifting techniques can be applied in order to extract the height information from the interference fringes. Heterodyne interferometers are used to measure rough surfaces, i.e. two wavelengths are used, which leads to a comparatively long synthetical wavelength, as desribed in "Rough Surface Interferometry with a Two-Wavelength Heterodyne Speckle Interferometer" by A. F. Ferchner, Applied Optics 24, 2181 (1985). However, all coherent interferometers suffer from $2\pi$-ambiguities, which means that the height variation between two adjacent pixels must not exceed half of the wavelength and should be continuous.

In "Three-Dimensional Sensing of Rough Surfaces by 'Coherence Radar'", by T. Dresel, G. Häusler, H. Venzke, Applied Optics 31 (1992) and in "Coherence Radar—An Accurate Sensor for Rough Surfaces", by G. Häusler, J. Herrmann, Proc. SPIE 1822: Optics, Illumination an Image Sensing for Machine Vision VII, Boston, Mass. (1992) and in German Pat. No. DE4108944C2 (3/1991 Häusler) and in U.S. Pat. No. 5,133,601 (7/1992 Cohen et al.) a method, known as the coherence radar or as a rough surface profiler, has been disclosed which is based on a two beam interferometer, a Michelson interferometer in particular. One of the mirrors is replaced by the rough, scattering object to be measured. The light coming from a low-coherent light source is collimated and directed to a beamsplitter. One beam is reflected from the reference mirror, the other beam is scattered from the sample surface. In order to equal out the different intensities, a neutral density filter is inserted in the reference beam. This in turn requires a glass plate in order to compensate for dispersion introduced by the neutral filter. The reference mirror and thus all parts of the object which are in the reference plane are imaged onto a solid-state imaging array, preferably a CCD camera.

Due to the low coherent illumination and due to the fact that the observation aperture exceeds the illumination aperture, the camera observes speckle. It would be ideal, if one camera pixel detects one speckle only. Each speckle comes from a specific object location (x,y). Since the phase of each speckle is not determined and varies from speckle to speckle, the phase evaluating techniques of conventional interferometry cannot be used in order to get the height information.

As the object (or the reference mirror) is moved coaxially to or from the illumination by means of a translation stage, all those speckle show an intensity modulation the associated object locations of which pass through the reference plane:

$$I(z) = \bar{I} + M(z - z_0) \cdot \cos\left(\frac{2 \cdot \pi}{\lambda} \cdot 2 \cdot (z - z_0) + \phi(z)\right)$$

This modulation is an amplitude modulation, which is a function of the translation stage position z rather than a function of time, the latter is the case in communications theory. The inverted carrier frequency of the amplitude modulated signal equals half the wavelength $\lambda$ of the light source. Since the phase information is void, only the modulation envelope M or rather the maximum of the envelope has to be extracted from the signal. The maximum of the envelope indicates that the corresponding location of the pixel/speckle is exactly in the reference plane $Z_0$.

The entire object has to be moved through the reference plane. Each time a speckle shows a maximum in modulation, i.e. each time the modulation envelope is a maximum, the location z of the translation stage has to be stored for that particular pixel/speckle. After all object locations have passed the reference plane, the surface profile is available.

If the object is moved at a constant speed, the amplitude modulation is also a function of time and the demodulation techniques of the communications theory can be applied: In order to extract the envelope, the signal is input to a band pass filter, followed by a rectifier and a low pass filter. This method can easily be applied to a point sensor, which only measures one point, i.e. which only observes one speckle at a time. A surface profiler which observes a two dimensional surface by using a two-dimensional array of pixels cannot directly make use of this technique due to the signal processing required for each pixel.

There are three different approaches known for extracting the envelope using a CCD camera.

The first approach does not extract the envelope but determines the depth of modulation in a quasi-static way: The object is moved to the position $Z_i$ first and a video frame is stored. After that the reference mirror, which is attached to a piezo electric transducer, is shifted twice by $\lambda/6$, where $\lambda$ is the medium wavelength of the light source. After each shift another frame is stored. The depth of modulation M at the position $Z_i$ of each pixel can directly be calculated using the three intensities $I_n(x,y)$ n∈[0..2]:

$$M(z_i) = \sqrt{\sum_{n=0}^{2}(I_n - \bar{I})^2} \quad \text{where} \quad \bar{I} = \frac{1}{3}\sum_{n=0}^{2} I_n.$$

After that, the translation stage moves the object to $Z_{i+1}$ and the procedure described is repeated. If $M(Z_i)$ is a maximum for a pixel, $Z_i$ is stored for that pixel. A disadvantage of this method is that three frames are required for determining the depth of modulation for one position $Z_i$. Furthermore all movements have to be completed between subsequent frames, i.e. the translation stage and the piezo must have reached their position before the frames are grabbed. Hence this method is quasi-static and rather slow.

Another approach to demodulate the signals in parallel allows to move the object continuously. At a low translation speed, a high speed camera sends its frames to a frame grabber where all frames are stored for an off-line evaluation. The integration time of the camera has to be short enough not only to match the Nyquist sampling theorem but also to be able to neglect the change of intensity of each pixel within one integration time. This method is fairly fast, the range of measurement, however, is restricted to the number of frames which can be stored in the frame grabber. A range of measurement of 1 mm at 10 samples per modulation cycle using a 630 nm light source requires about 32,000 frames!

A third known demodulation method uses an on-line evaluation by means of digital filters which process the camera data in video real time. Again the modulation has to be sampled matching the Nyquist sampling theorem which requires either a slow continuous movement or a quasi-static operation mode. Due to the fact that the position of each sample has to be known very precisely, a piezo is used, which again restricts the range of measurement.

There is a strong need for a method which allows to measure with a low coherent interferometer preferably on rough surfaces at a high speed with no limitation in terms of longitudinal range of measurement.

SUMMARY OF THE INVENTION

Accordingly, it is an object of the invention to provide a method for interferometrically profiling rough surfaces extremely rapidly.

It is another object of the invention to provide a method for interferometrically profiling rough surfaces at a constant quotient of measuring speed and accuracy.

It is another object of the invention to provide a method for interferometrically profiling rough surfaces without having to sample the modulation in accordance with the Nyquist sampling theorem.

Briefly described, the invention provides a method which extracts the envelope of the intensity modulation for many speckle or interference fringes in parallel. This modulation appears when the corresponding object locations are moved through the reference plane of a two-beam low coherent interferometer.

This is achieved by applying a modification of the "coherent demodulation principle", which is well known in communications theory for demodulating amplitude modulated signals as shown in "Nachrichtentechnik", by K. D. Kammeyer, Stuttgart (1990). The object is moved by means of a translation stage at a preferably constant speed. The light source is modulated depending on the current position z of the translation stage due to the fact that the modulation is a function of z rather than a function of time. During the integration time of the observing solid-state imaging array, preferably a CCD camera, the incoming intensity is accumulated and read out after each video cycle. In order to get rid of the phase dependency of the coherent modulation of the light source, the phase of the modulation can be switched after each video cycle, preferably by $\pm\pi/2$. If a light source is used which cannot be modulated, the sensitivity of the camera or the flux of light which hits the camera target can be modulated instead. Due to the continuous movement and the trade-off between speed of measurement and accuracy, the method is called dynamic coherence radar

DETAILED DESCRIPTION OF THE INVENTION

Figure 1:
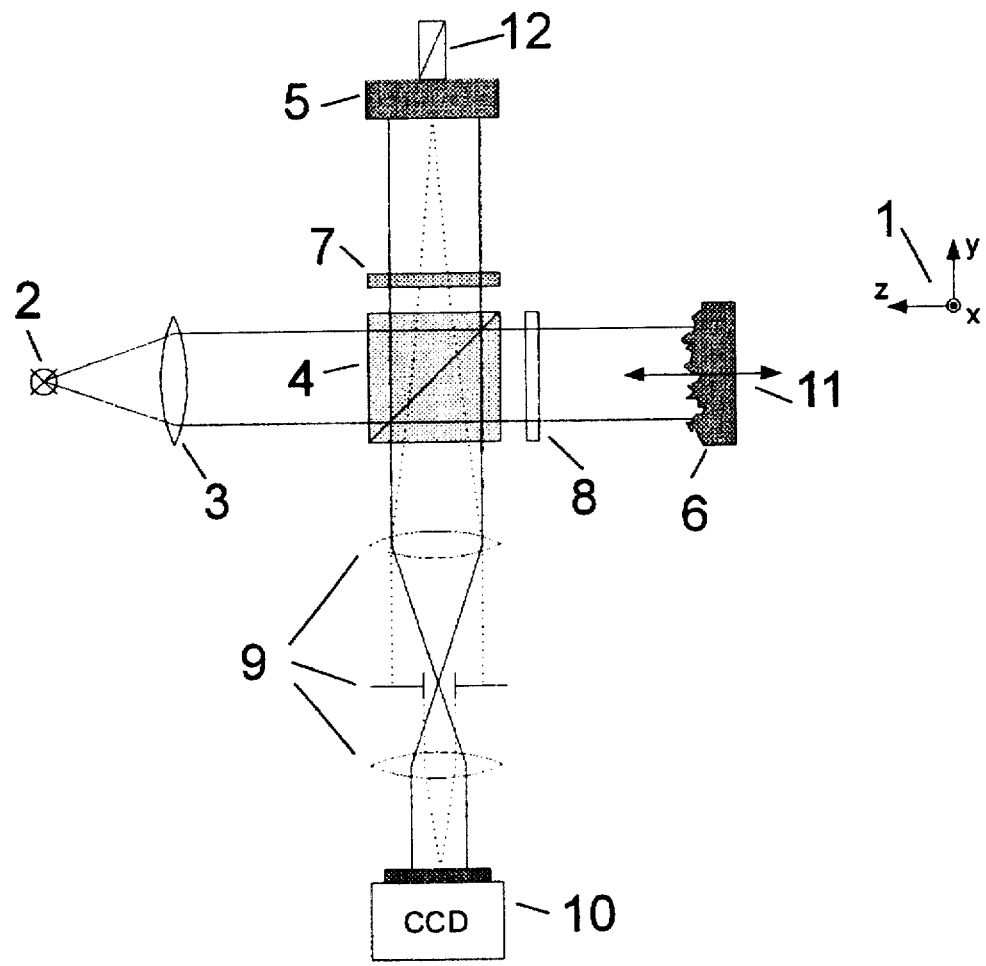
FIG. 1 is a schematic setup of a coherence radar as a surface area profiler.

The inventive method is to be used as a control and evaluation method for low coherent interferometers and for the coherence radar in particular, the setup of which is shown in FIG. 1. The object is embedded in a cartesian coordinate system (1). The beam emitted by a short coherent light source (2) is collimated (3) and send to a beamsplitter (4). One beam is reflected from the reference mirror (5) the other beam is scattered from the (rough) object (6). In order to equal out the reflected intensities in either interferometer arm, a neutral filter (7) is inserted in the reference beam. This requires a glass plate (8) in the object beam, in order to compensate for dispersion introduced by the neutral filter. The interferring two beams pass an optical system for observation (9) and hit the target of a solid-state imaging array, preferably a CCD camera (10). The object is attached to a translation stage (11), for a special embodiment the reference mirror is fixed on a piezo electric transducer (12).

Figure 2:
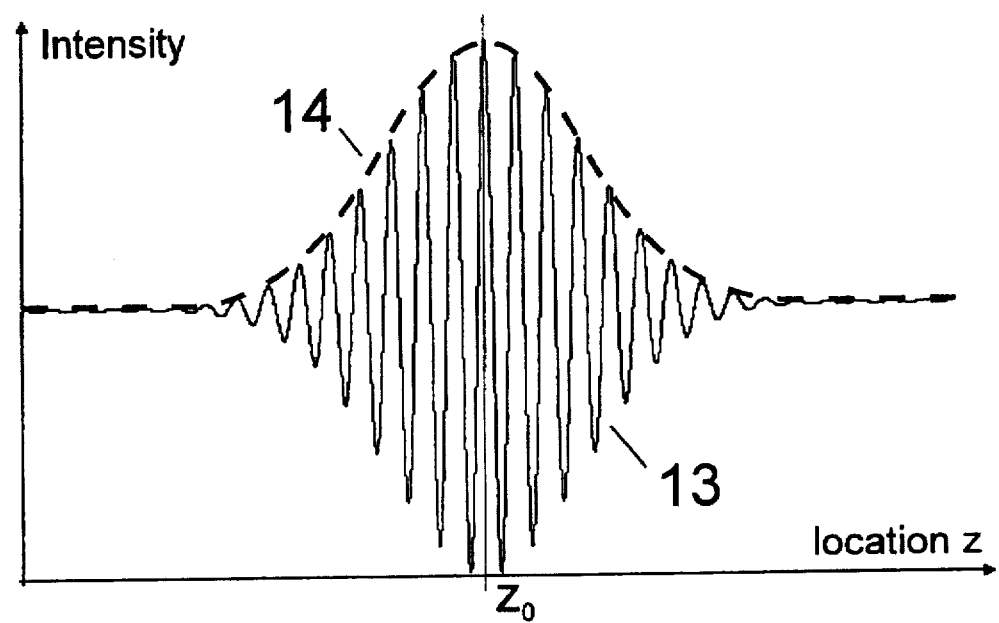
FIG. 2 is a diagram of an interferogram also called the correlogram and the envelope as it can be observed when an object mirror passes through the reference plane $Z_0$.
Figure 3:
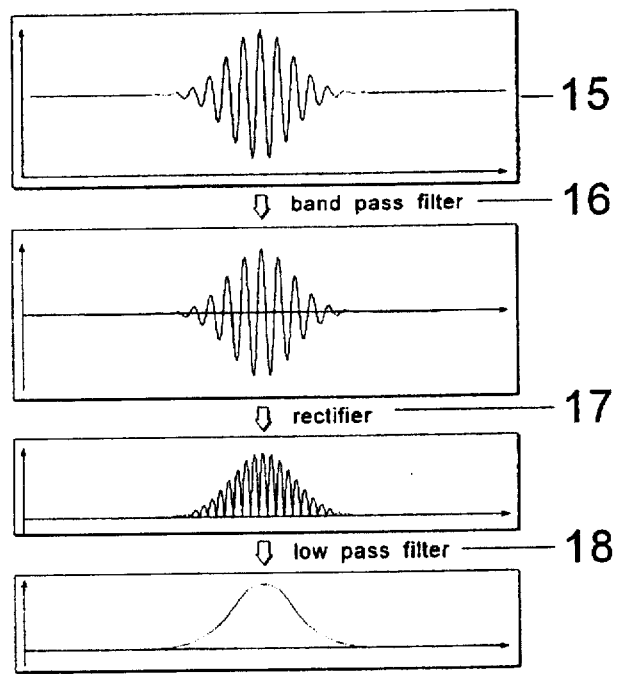
FIG. 3 is a diagram of the envelope demodulation of an amplitude modulated signal as it is known in communications theory.

If the object (6) is a mirror, a modulation (13) can be seen as shown in FIG. 2. The intensity varies as the object (6) passes through the reference plane $Z_0$. The modulation (13) itself is not of particular interest due to the phase being void in case of rough objects. Only the envelope (14) or rather the maximum of the envelope has to be extracted.

If the object (6) is rough, speckle are observed and it would be ideal if one pixel observes one speckle. Each speckle comes form a specific location (x,y) of the object surface (11), which in turn leads to the fact that each pixel corresponds to a specific location (x,y), too. As a rough object (6) is shifted, all those speckle show a modulation (13) the corresponding object locations of which pass through the reference plane of the interferometrical setup. The position z of the translation stage (11) has to be stored for each pixel when the maximum of the envelope (14), i.e. the maximum of modulation has been reached. After the entire object has been passed through the reference plane, a complete twodimensional surface profile has been recorded.

In order to extract the envelope (14) from the modulation (13) the signal (15) of one pixel or speckle can be input to a band pass filter (16) followed by a rectifier (17) and a low pass filter (18). However, there is not such a device for evaluating many pixels in parallel yet.

Figure 4:
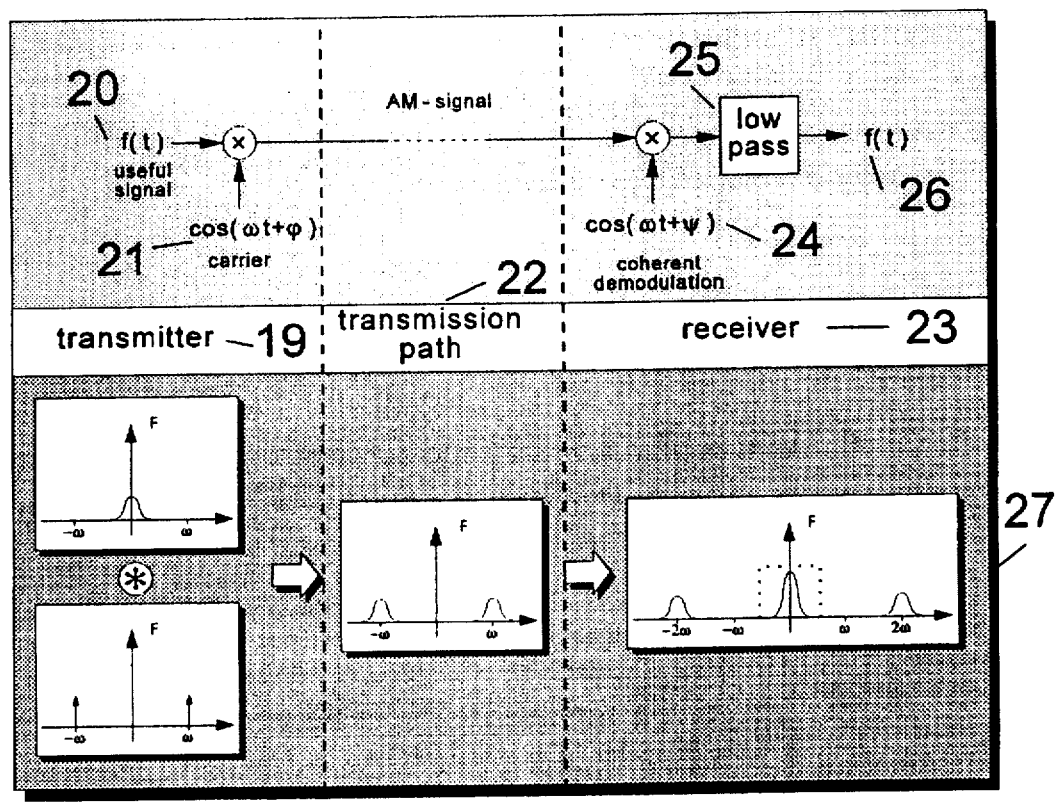
FIG. 4 is a processing schematic of the method of coherent demodulation of an amplitude modulated signal as a system (upper half) and in the Fourier domain (lower half)

The inventive method modifies another method for demodulating an amplitude modulated signal known from communications theory—the coherent demodulation which is shown in FIG. 4. The useful signal (20) is modulated with a carrier frequency (21) in the transmitter (19) and transmitted (22) as an amplitude modulated signal. The receiver (23) again modulates the incoming signal with the carrier frequency (24) and the result is input to a low pass filter (25), which extracts the original useful signal (26). The whole procedure is shown in the Fourier domain as well (27).

Figure 5:
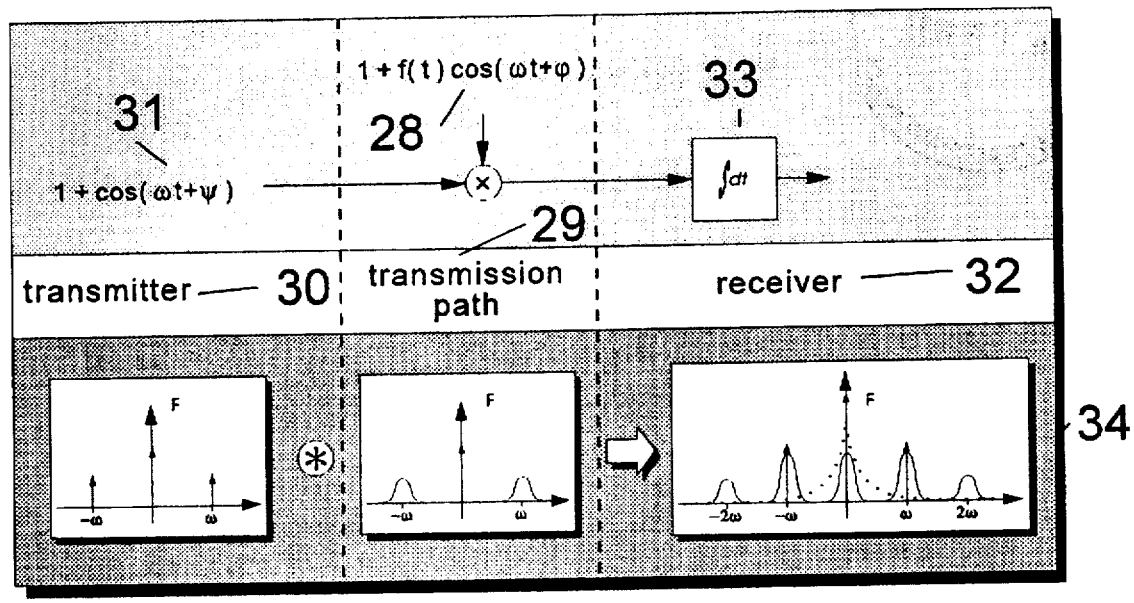
FIG. 5 is a similar diagram of the modification of the coherent demodulation of FIG. 4, which is a coherent light modulation in case of the coherence radar.

If the communications theory scheme of having a transmitter, a transmission path and a receiver is applied to the coherence radar as shown in FIG. 5, the light source is the transmitter (30), the two-beam interferometer is the transmission path (29) and the camera is the receiver (32).

Due to the fact that the system, shown in FIG. 4 for coherently demodulating an amplitude modulated signal, is linear, all elements can be interchanged. If the envelope (14) is regarded as the useful signal to be extracted, the modulation (28) occurs on the transmission path (29). Instead of the coherent demodulation (24) of the signal a coherent modulation (31) of the light source is used. The low pass filter (25) is replaced by a solid-state imaging array, preferably a CCD camera (10). The photodetector has to integrate (33) the incoming intensity during a certain period of time. The whole procedure is shown in the Fourier domain (34) as well and the influence of the DC-terms can be seen which is unavoidable due to non-existent negative intensities.

Figure 6:
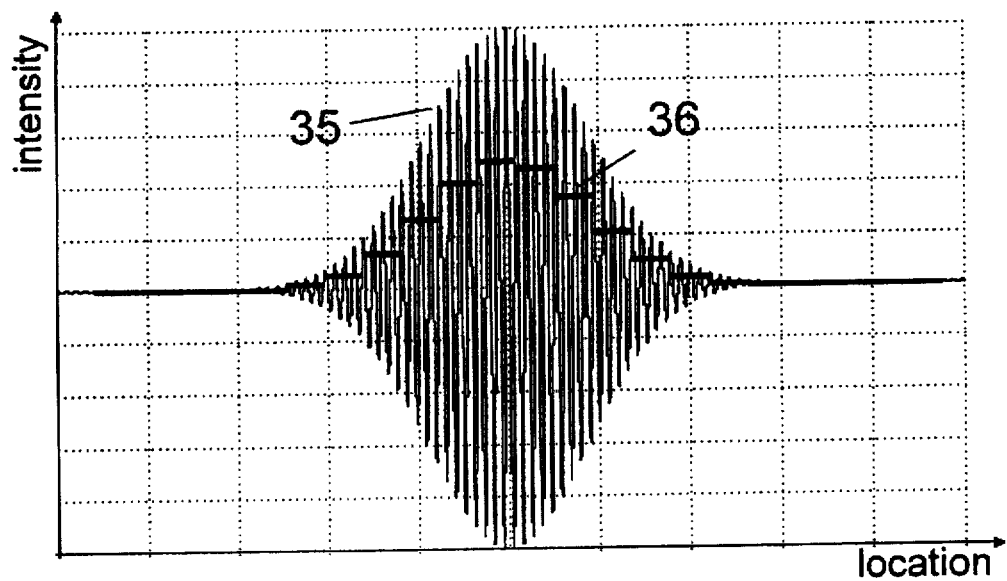
FIG. 6 is a view similar to FIG. 2, of a low coherent correlogram, however with the envelope is extracted section by section; the bars mark the integration time of a camera and the intensity received during that time.

FIG. 6 shows the correlogram (35) with the light source not being modulated and the received intensitiy values for one pixel (36). Each bar marks the beginning and the end of the integration time of the pixel and the intensity accumulated during that time.

If a simple two state light modulation is used (on/off) the method can be illustrated more easily. A modulation (13) as shown in FIG. 2 shall be given. The light source (2) has to be switched on and off periodically with the position z, i.e. it has to be switched every $\lambda/4$ where $\lambda$ is the medium wavelength of the light source (2). The phase of the modulation (13) shall be determined in a way that the light source (2) is switched to on whenever the intensity would exceed the average value in case of a CW light source. Due to the fact that the photodetector (33) integrates over a certain period which should contain several on and off states, the received intensity would normally be half of the average intensity unless the object (6) gets closer to the reference plane. For that case the camera (33) integrates over the intensities which exceed the average value and the envelope (36) is extracted. The same holds for a photo detector with a low pass characteristic in terms of time. If the object (6) is moved at a constant speed the light source (2) can be modulated with a constant frequency. If a constant speed is not feasible the light modulation (31) can be controlled by the current translation stage position (11).

The extracted envelope (36) is quantized, however, the accuracy in detecting the maximum can be improved by interpolation. The highest three values can be used and matched with a Gaussian function or a parabola.

In order to get rid of the DC-term, the phase of the light modulation has to be switched by $\pi/2$ after every integration time, and the correponding pixels of subsequent frames have to be added.

If a light source cannot be modulated, the sensitivity of the photodetector or the flux of light hitting the target can be modulated instead.

The method described only works with the light modulation and the correlogram-having the same phase. Due to the fact that the phase of a speckle is undetermined and that many speckles are to be evaluated in parallel, there is no phase for the light modulation which matches the modulation phase of all speckles/pixels.

Figure 7:
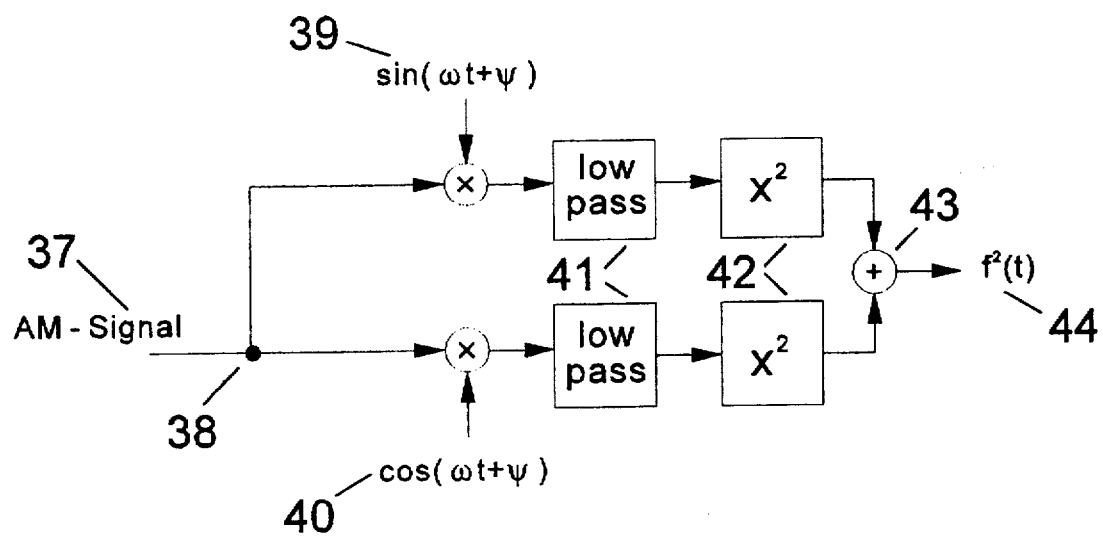
FIG. 7 is a schematic view of the method of quadrature amplitude demodulation as it is known in communications theory, in order to get the useful signal regardless of the carrier phase.

Hence the invention covers an extension of the method having been described. It is based on the quadrature amplitude (de)modulation (QAM) known in communications theory, which is shown in FIG. 7.

The amplitude modulated signal (37) is split (38) and modulated with two orthogonal signals (39)(40) of the same frequency. Each path passes a low pass filter (41) and a quadrature element (42). Adding the two pathes (43) leads to the useful signal squared (44).

This method could directly be applied if the sensitivity of the photodetector or if the flux of light hitting the photodetector target was modulated rather than the light source. For this case one only has to use two photodetectors and a beamsplitter.

Figure 8:
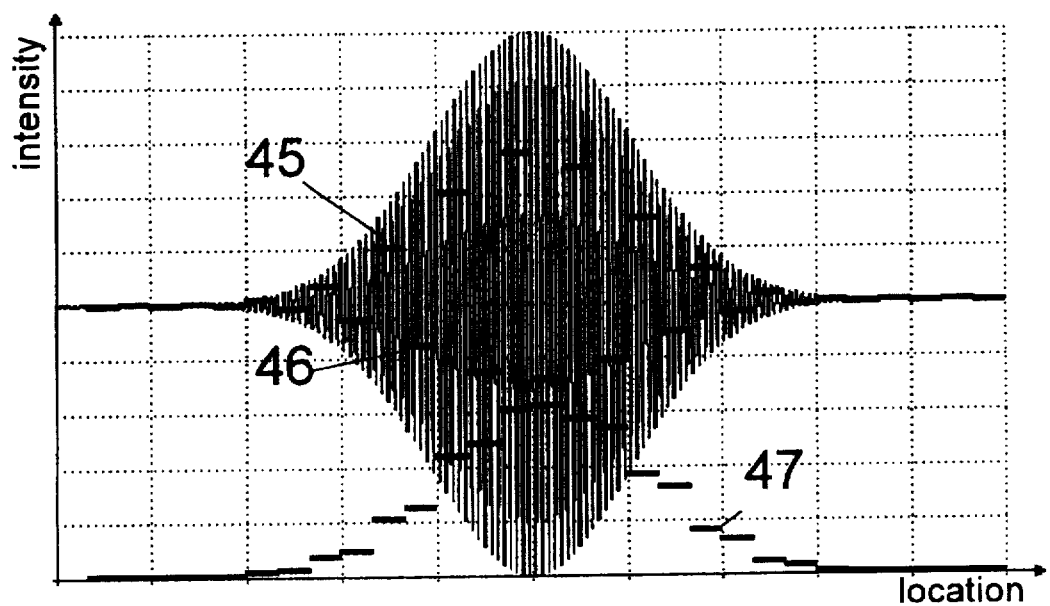
FIG. 8 is a further schematic view, similar to FIG. 6, of a low coherent correlogram, the envelope of which has been extracted without a DC-term (lower bars) and regardless of the correlogram-phase by means of a CCD camera, as achieved by switching the phase of the modulation in two subsequent frames by $\pm\pi/2$ and by linking those frames.

If there is no coherent demodulation on the receiver side but a coherent modulation of the light source, i.e. on the transmitter side, the light source should be modulated with two orthogonal functions of the same frequency. This is not possible at the same time, however, the phase can be switched after each integration time and subsequent frame can be linked. One possibility is to switch the phase between 0 and $\pi/2$. The received intensities of corresponding pixels in two subsequent frames are linked as follows:

$$I(x,y) = \sqrt{(I_n(x,y) - \bar{I}(x,y))^2 + (I_{n-1}(x,y) - \bar{I}(x,y))^2} \quad (1)$$

where $I_n(x,y)$ and $I_{n-1}(x,y)$ are the received intensity of the pixel at the location (x,y) of the solid-state imaging array at the $n^{th}$ and the $(n-1)^{th}$ integration cycle. This method is visualized in FIG. 8. It can be seen that the phase is switched after each integration cycle (45)(46) and that the envelope (47) has been extracted regardless of the modulation phase.

Another more robust way of linking subsequent frames is to simply determine the absolute difference of corresponding pixels in subsequent frames:

$$I(x,y)=|I_n(x,y)-I_{n-1}(x,y)| \qquad (2)$$

This is the determination of the contrast of corresponding pixels in subsequent frames without normalization.

The present invention has the decisive advantage of enabling measurements at a continuous (high) speed without limitations in terms of range of measurement and with no need to fully sample the modulation in accordance to the Nyquist theorem. The measuring speed determines the distance along which the object is moved within one integration cylce, i.e. the faster the object is moved the longer is the distance and the lower is the accuracy of determining the maximum of the envelope. In other words, the accuracy of the sensor can be adjusted by selecting an appropriate measuring speed. This trade-off between accuracy and measuring speed only depends on the integration time of the photodetector, which suggests the use of a high speed camera.

If there is a need for a very precise measurement, the object has to be moved rather slow. This becomes a problem, if the object is not moved along many wavelengths or along a multiple of λ/2 during one integration cycle. For that case the light modulation which is asynchronous to the video cycle leads to flickering in subsequent frames. For slow measurements the amount of light emitted during each integration time has to be kept constant.

The highest accuracy is achieved at a very low speed, which means that during one integration time the object is moved along less than λ. Since the amount of light emitted during one integration cycle has to be kept constant, the modulation frequency has to be set to zero for that case. However, if a constant speed of λ/6 per video cycle is chosen, the same image processing can be used as suggested in equation 2, which leads to at least two evaluable intensity values in three subsequent frames.

We claim:

1. A method of profiling a surface of an object, which comprises the steps of:
   a) placing an object in vicinity of an interferometer having interferometer arms and a translation stage, and transmitting a low coherent light signal from a light source with a mean wavelength λ to the object;
   b) varying an optical path in one of the interferometer arms with the translation stage;
   c) receiving a resulting intensity-modulated interferometer signal with a photodetector having low pass characteristics and outputting photodetector output signals;
   d) evaluating the photodetector output signals with an image processing system; and
   e) extracting a depth of modulation of the interferometer signal by intensity-modulating the low coherent light source.

2. The method according to claim 1, which further comprises shifting the translation stage by respective λ/2 shifts and, during each λ/2 shift of the translation stage, varying an intensity of the light source between a high intensity and a low intensity.

3. The method according to claim 2, wherein the step of varying the intensity of the light source comprises varying the intensity sinusoidally.

4. The method according to claim 1, which comprises integrating a signal received by the photodetector section by section and thereby extracting an envelope of the interferometer signal.

5. The method according to claim 1, which comprises modulating the light source at a constant frequency f=2v/l, where v is a constant speed of the translation stage and λ is a mean wavelength of the light source.

6. The method according to claim 1, which comprises modulating the light source discontinuously by switching the light source on and off at a constant modulation frequency f=2v/l, where v is a constant speed of the translation stage and λ is a mean wavelength of the light source.

7. The method according to claim 1, which comprises integrating the incoming intensity signal section by section with solid-state imaging arrays having a given time of integration between subsequent readouts.

8. The method according to claim 7, wherein the solid-state imaging arrays are CCD-devices.

9. The method according to claim 1 which further comprises changing a phase of light modulation of the light source after each integration time of the photodetector.

10. The method according to claim 1, which comprises, shifting a phase of a modulation of a light output of the light source by π/2 after each integration time of the photodetector and adding corresponding pixels of two subsequent frames read out from the photodetector.

11. The method according to claim 1, which comprises alternately shifting a phase of a modulation of a light output of the light source by π/2 and by −π/2 after each integration time of the photodetectors.

12. The method according to claim 1, which further comprises subtracting an average value of a pixel of a respective photodetector from a present value of the pixel, squaring a difference determined in the subtracting step, and adding up the squared differences of corresponding pixels of subsequent frames.

13. The method according to claim 1, which further comprises storing, in addition to a maximum value for a pixel of a respective photodetector, a last and a next value for each pixel, and determining a position of the maximum value by interpolating wherein the position of the maximum.

14. The method according to claim 13, which further comprises determining a maximum of an absolute difference of subsequent values for each pixel.

15. The method according to claim 1, which comprises maintaining the light signal emitted by the light source constant during one integration time of the photodetector.

16. The method according to claim 1, which comprises setting a modulation frequency to zero at a translation stage speed of λ/6 per video cycle.

17. A method of profiling a surface of an object, which comprises the steps of:
   a) placing an object in vicinity of an interferometer having interferometer arms and a translation stage, and transmitting a non-modulated low coherent light signal with a mean wavelength λ from a light source to the object;
   b) varying an optical path in one of the interferometer arms with the translation stage;
   c) receiving a reflected signal with a photodetector having low pass characteristics and outputting photodetector output signals;
   d) evaluating the photodetector output signals with an image processing system; and
   e) extracting a depth of modulation of the interferometer signal by modulating one of a flux of light which hits the photodetector, and a sensitivity of the photodetector.

* * * * *